United States Patent
Towell

Patent Number: 6,052,680
Date of Patent: Apr. 18, 2000

[54] METHOD AND APPARATUS FOR DETERMINING WHETHER TO ROUTE AN INPUT TO A PROCESS BASED ON A RELEVANCE BETWEEN THE INPUT AND THE PROCESS

[75] Inventor: Geoffrey Gilmer Towell, Metuchen, N.J.

[73] Assignee: Siemens Corporate Research, Inc., Princeton, N.J.

[21] Appl. No.: 08/884,897

[22] Filed: Jun. 30, 1997

[51] Int. Cl.⁷ .................................................. G06F 15/18
[52] U.S. Cl. .............................. 706/47; 706/48; 709/223
[58] Field of Search ..................... 706/47, 48; 709/223

[56] References Cited

U.S. PATENT DOCUMENTS

| | | | |
|---|---|---|---|
| 5,390,298 | 2/1995 | Kuszmaul et al. | 395/800.22 |
| 5,463,735 | 10/1995 | Pascicci et al. | 395/200.52 |
| 5,530,809 | 6/1996 | Douglas et al. | 395/200.8 |
| 5,634,010 | 5/1997 | Ciscon et al. | 395/200.53 |

*Primary Examiner*—Tariq R. Hafiz
*Assistant Examiner*—Wilbert L. Starks, Jr.
*Attorney, Agent, or Firm*—Donald B. Paschburg

[57] ABSTRACT

Methods and apparatus for determining whether to route an input to a (rule-based) decision system based on a relevance between the input and the decision system. The relevance may be determined based on known or proprietary information retrieval concepts.

26 Claims, 12 Drawing Sheets

290a' schedule
monday
tuesday
wednesday
thursday
friday
with
january
february
march
april
may
june
july
august
september
october
november
december
meeting

FIG. 7B

290b' request
information
soon
buy
purchase
product
qqq
zzz

METHOD AND APPARATUS FOR DETERMINING WHETHER TO ROUTE AN INPUT TO A PROCESS BASED ON A RELEVANCE BETWEEN THE INPUT AND THE PROCESS

BACKGROUND OF THE INVENTION a. Field of the Invention

The present invention concerns methods and apparatus for determining whether to route an input (e.g., a message) to a system for further processing. The routing determination is based on a relevance between the input and the system. In particular, the present invention concerns methods and apparatus for determining whether to route a message (such as an incoming e-mail message for example) to decision systems (such as a rule-based decision system for responding to product inquiries or a system to schedule a meeting for example).

b. Related Art

Over the last few decades, the use of decision systems, such as rule-based systems, neural networks, expert systems, fuzzy logic systems, etc., to permit machines to make decisions formerly made by humans has increased dramatically. For example, such systems have been often used to classify or recognize a system input.

Unfortunately, as these systems are applied to ever more complex applications, their complexity may increase to such an extent as to become difficult to manage (e.g., debug, update, modify, etc.). For example, in a rule-based decision system, if the number of rules is relatively large (e.g., on the order of 1000 rules), changes to the rules of the decision system or adding new rules to the decision system often results in unexpected, unwanted, and difficult to diagnose, changes elsewhere in the decision system. Although decision systems based on fuzzy logic may be easier to implement and maintain, such systems are not appropriate for certain applications. In another example, although natural language processing decision systems generally work well when processing language in a particular topic, they generally do not work well when processing more general language. For example, natural language processors have difficulty interpreting the word "not". Although such problems have been acknowledged, they have, for the most part, been ignored.

Accordingly, there exists a need to simplify decision systems while, at the same time, permitting such systems to be used in complex applications.

SUMMARY OF THE INVENTION

The present invention permits simple decision systems to be applied to complex applications. The present invention does so by providing device for determining whether to apply an input to one or more of two decision systems. The device includes: (a) a relevance determination unit for determining a relevance of the input with respect to one or more of the two decision system; (b) means for applying a predetermined relevance parameter to the determined relevance associated with each of the one or more decision systems; and (c) means for applying the input to a decision system if the relevance associated with that decision system meets the predetermined relevance parameter.

The relevance determination unit may be an information retrieval means. More specifically, the relevance determination unit may determine a distance between a vector based on words of the input and known vector(s), each of the known vector(s) being determined by words related to an associated one of the decision system(s). The relevance parameter may be a predetermined threshold value.

In a system including a routing determination unit, a first decision system, and a second decision system, the present invention provides a method for deciding whether to apply an input, applied to the routing determination unit, to at least one of the first and second decision systems. The method includes steps of: (a) determining a relevance value of the input with respect to each of the first and second decision systems; (b) applying a relevance parameter to the determined relevance value associated with each of the first and second decision systems; (c) invoking the first decision system if the relevance value associated with the first decision system meets the applied relevance parameter; and (d) invoking the second decision system if the relevance value associated with the second decision system meets the applied relevance parameter.

A step of preprocessing the input may be performed before the step of determining a relevance value is performed. If the input (such as an e-mail message for example) includes textual information, the step of preprocessing may include sub-steps of removing word stems, removing punctuation, removing stop words, replacing capital letters with lowercase letters and/or alphabetizing.

The step of determining a relevance value of the input with respect to each of the first and second decision systems may include sub-steps of: (i) forming a first vector in m-dimensional space based on words contained in the input; (ii) forming a second vector in m-dimensional space based on words associated with the first decision system; (iii) forming a third vector in m-dimensional space based on words associated with the second decision system; (iv) determining a relevance value of the input with respect to the first decision system based on a distance between the first and second vectors; and (v) determining a relevance value of the input with respect to the second decision system based on a distance between the first and third vectors. The distance between the first and second vectors and the distance between the first and third vectors may be cosine distances.

The relevance parameter used in the method of the present invention may be a predetermined threshold value. In this case, the step of applying the relevance parameter to the relevance value associated with each of the first and second decision systems may include sub-steps of comparing the relevance value associated with each of the first and second decision systems with the predetermined threshold value.

Finally, the present invention includes a system for processing an input. The system includes a first decision system, a second decision system, a relevance parameter, and a routing determination unit. The first decision system has a first set of characteristic information and the second decision system has a second set of characteristic information. The routing determination unit has an input for receiving the input, a first output coupled with the first decision system, and a second output coupled with the second decision system. The routing determination unit determines a first relevance value based on the input and the first set of characteristic information of the first decision system. The routing determination unit then determines whether to apply the input to the first decision system based on the first relevance value and the relevance parameter. The routing determination unit may also determine a second relevance value based on the input and the second set of characteristic information of the second decision system. If it does so, the routing determination unit will then determine whether to apply the input to the second decision system based on the second relevance value and the relevance parameter.

The system input may include textual information. The first set of characteristic information may be a first word list and the second set of characteristic information may be a second word list. In this case, the routing determination unit may include a relevance determination unit for determining the first relevance value based on a distance between an m-dimensional vector based on words of the input and an m-dimensional vector based on words of the first word list, and for determining the second relevance value based on a distance between the m-dimensional vector based on words of the input and an m-dimensional vector based on words of the second word list.

At least one of the first and second decision systems is a rule-based system such as a rule-based system for scheduling a meeting, a rule-based system for responding to a product inquiry, or a rule-based system for assigning incoming queries to an appropriate person in a help center. If the first decision system is a rule based system for scheduling a meeting, the first set of characteristic information may be a first word list which includes the days of the week, the months of the year, and/or the words "schedule", "with" and/or "meeting". If the second decision system is a rule based system for responding to a product inquiry, the second set of characteristic information may be a second word list which includes the words "request", "information", "soon", "buy", "purchase", and/or "product".

The system may also include a storage area for storing firm data. Contents of the storage area may be accessed by the first and/or second decision systems. The firm data may include product information and/or employee schedules. The system may also include a storage area for storing personal data. Contents of the storage area may be accessed by the first and/or second decision systems. The personal data may include a list of employees to respond to an employees e-mail when the employee is unavailable.

In the system, if the input is applied to one of the first and second decision systems and that decision system cannot process the input, that decision system may so inform the routing determination unit.

DETAILED DESCRIPTION

The present invention concerns novel methods and apparatus for determining whether to route an input (e.g., a message) to at least one of a number of decision systems. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiment shown.

In the following, the term "routing" should be interpreted broadly to include, inter alia, "communicating", "communicating a portion of", "communicating a copy of", and/or "communicating a copy of a portion of".

In the following, the functions performed by the present invention, in a general environment, are described. Then, the structure of an exemplary system and method for practicing the invention is described. Thereafter, the operation of the exemplary system is described. The function, structure and operation of the present invention is also described in the context of methods and apparatus for determining whether to route an incoming e-mail to at least one of a rule-based system for responding to a product inquiry and a rule-based system for scheduling a meeting.

The present invention, in a general environment, functions to (i) accept an input, (ii) preprocess the input to form a preprocessed input, (iii) determine a relevance value of the preprocessed input with respect to one or more of at least two decision systems, and (iv) invokes a decision system(s) if the determined relevance value meets a predetermined relevance parameter(s). In this way, rather than having one complex decision system defined by a large number of rules, a number of smaller (e.g., with respect to the number of rules) decision systems can be used. Using such "smaller" decision systems is advantageous because rule changes are easier to implement.

Figure 1:
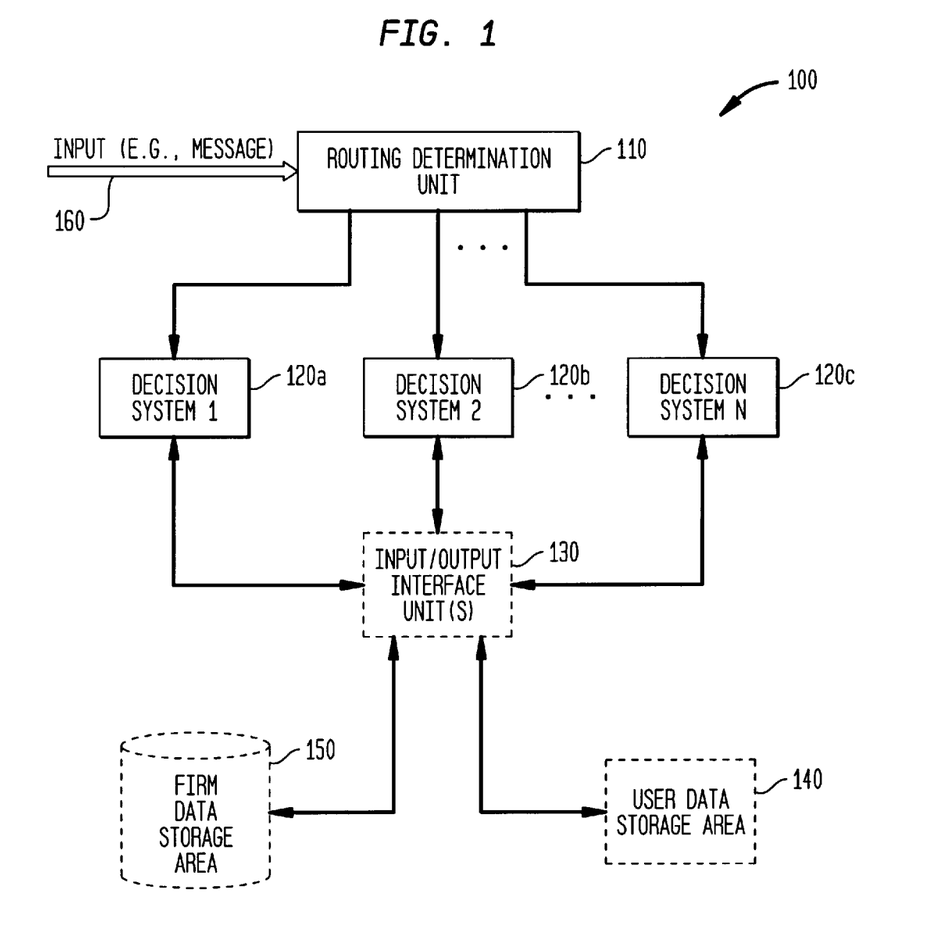
FIG. 1 is a high level block diagram of a system for determining whether to route an input to a decision system based on a relevance between the input and the decision system.

A structure of an exemplary system and method for practicing the invention is now described. FIG. 1 is a high level block diagram of a system 100 for determining whether to route an input (e.g., message 160) to at least one of a number of decision systems 120 based on a relevance between the input 160 and each of the decision systems 120. As shown in FIG. 1, the system 100 basically includes a routing determination unit 110 and a number of decision systems 120. Further, though not necessary for practicing the present invention, one or more of the decision systems 120 may access data from a user data storage area 140 and/or a firm data storage area 150 via input/output interface unit(s) 130. The routing determination unit 110, which may route an input based on information retrieval filtering concepts, determines whether to route the input (e.g., incoming message) 160 to at least one of the decision systems 120.

As shown in FIG. 14, the system 100 may be carried out on a system 1400 including a processor(s) 1402, an input/output interface unit(s) 1404, and a storage device(s) 1406, all of which may share a system bus 1408. More specifically, the processor 1402 may execute program instructions (e.g., stored in storage device(s) 1406) to effect the present invention.

Figure 3:
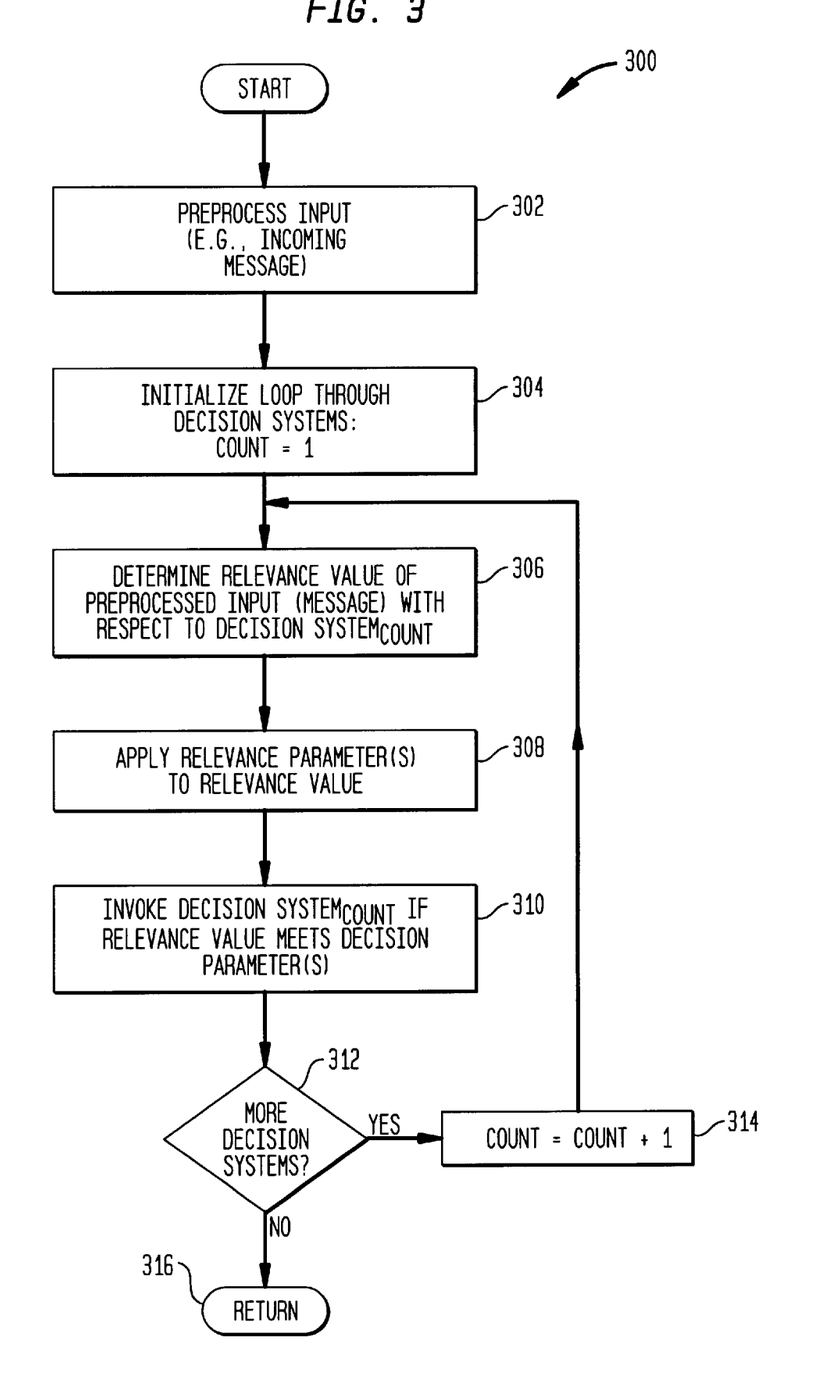
FIG. 3 is a flow diagram of a process for determining whether to route an input to a decision system based on a relevance between the input and the decision system.
Figure 6:
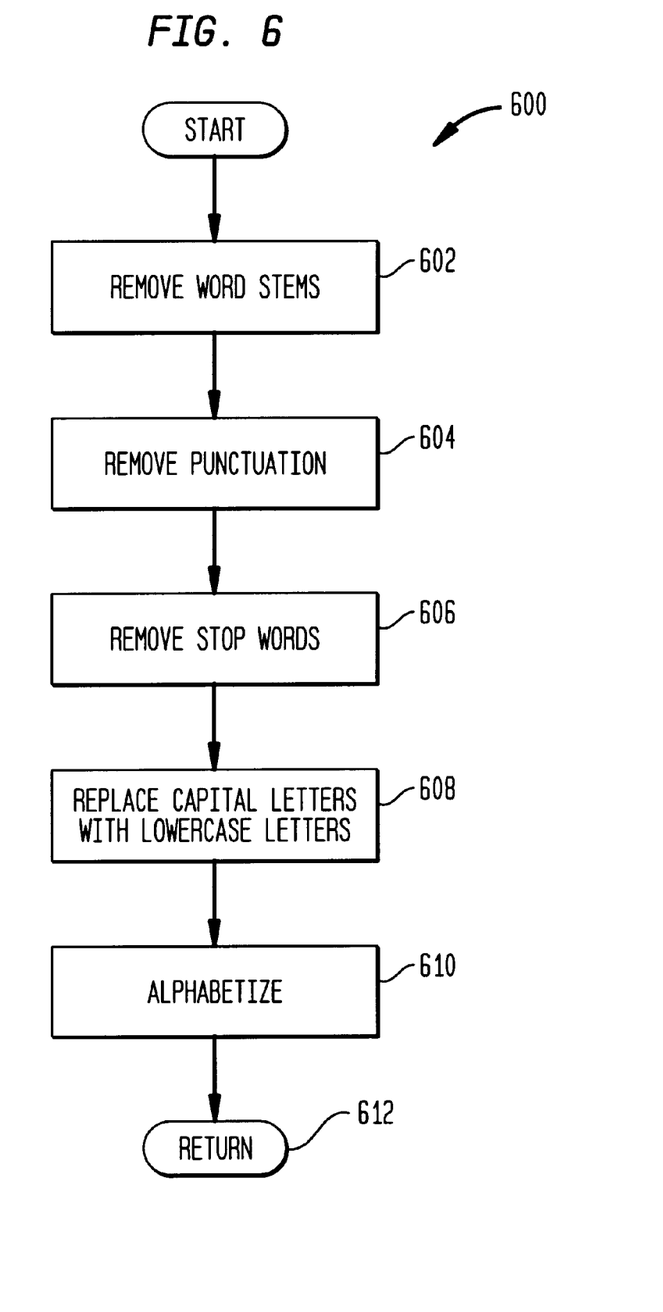
FIG. 6 is a flow diagram of an exemplary message preprocessing process.

FIG. 3 is a flow diagram of a process 300 for determining whether to route an input (e.g., a message) to a decision system based on a relevance between the input and the decision system. First, as shown in step 302, the input is preprocessed. FIG. 6 is a flow diagram of an exemplary process 600 for preprocessing an input which includes textual information, such as an e-mail file for example. The exemplary preprocessing process 600 may (i) remove word stems as shown in step 602, (ii) remove punctuation as shown in step 604, (iii) remove "stop words" as shown in step 606, (iv) replace capital letters with lowercase letters as shown in step 608, and continue processing at return node 612. As is known, a "stop word" is a common word (e.g., "of", "the") which conveys little inherent information. The preprocessing process 600 may also alphabetize the resulting words as shown in step 610. Although the word stem removal, punctuation removal, stop word removal and capital to lowercase letter replacement steps are shown in a particular order, these steps may be performed in any order and/or concurrently.

Returning to FIG. 3, in a loop through all decision systems, as shown in steps 304, 312 and 314, the following processing occurs. More specifically, as shown in step 304, a loop through the decision systems is initialized by setting a COUNT value to 1. Thereafter, as shown in step 306, a relevance value of the preprocessed input (message) with respect to the decision system$_{count}$ is determined. Next, as shown in step 308, a relevance parameter(s) is applied to the determined relevance value. Thereafter, as shown in step 310, if the determined relevance value meets the relevance parameter(s), the decision system$_{count}$ is invoked and the message is provided to that decision system. As shown in steps 312 and 314, the steps 306, 308, and 310 are repeated for each of the decision systems. Processing continues at return node 316.

Figure 5:
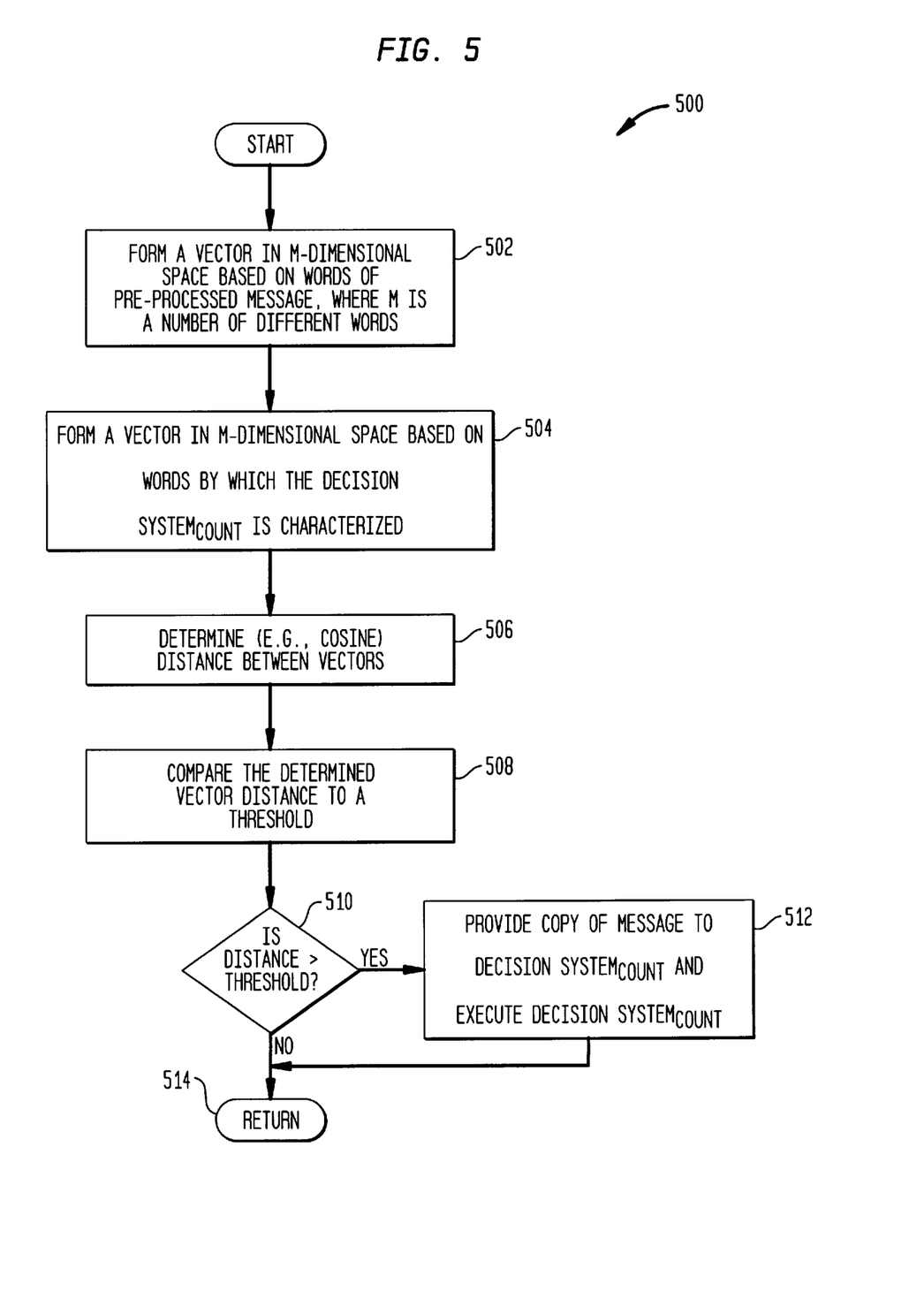
FIG. 5 is a flow diagram of an exemplary process for (i) determining the relevance of a preprocessed message with respect to a decision system, (ii) applying relevance parameter(s) to the determined relevance, and (iii) invoking a decision system if the relevance determined meets the relevance parameters.

FIG. 5 is an exemplary process 500 for performing the steps 306, 308, and 310 (i.e., determining a relevance value of a preprocessed input message with respect to a decision system, applying a relevance parameter(s) to the determined relevance value, and invoking the decision system if the relevance value meets the relevance parameter(s)). More specifically, the process 500 may use known information retrieval techniques to determine the relevance value of an input message. Although information retrieval systems and concepts are well known, a brief overview is provided for the readers convenience. Information retrieval systems process queries to determine which of a number of resources (e.g., electronically stored text documents) most likely matches the query. In many cases, information retrieval systems score and rank order resources based on the query. Referring now to FIG. 5, as shown in step 502, a vector in m-dimensional space is formed based on words of the preprocessed input message. In this case, m is a number of different words and may, for example, be on the order of 10,000. Next, as shown in step 504, a vector in m-dimensional space is formed based on words by which the decision system is characterized. As will be discussed below with respect to FIGS. 7a and 7b, a predetermined list of words may be used to characterize the nature of a decision system or to flag words likely included in an input relevant to the decision system. Naturally, since the words characterizing the decision system are predetermined, this vector determination step 504 can be done in advance so that the resulting vector is predetermined. That is, the vector determination step 504 need not be performed in response to each message; it can be done once, in advance. Thereafter, a distance between the vectors is determined as shown in step 506. In general, the greater the distance between the vectors, the less relevant the message is to the decision system being considered. If, however, a so-called "cosine distance" is determined, a value of zero (0) to one (1) is returned, where higher values are more relevant. Thus, the vector determination steps 502 and 504 and the distance determination step 506, collectively, illustrate an exemplary way of determining a relevance value of a preprocessed message with respect to a decision system (see step 306 of FIG. 3).

Next, as shown in step 508, the determined vector distance is compared to a predetermined threshold value. This step illustrates an exemplary way of applying a relevance parameter(s) to a determined relevance value (see step 308 of FIG. 3). Thereafter, as shown in steps 510 and 512, if the distance is greater than the predetermined threshold value (assuming higher distance value corresponds to a higher relevance as is the case with a cosine distance value), the input message is provided to the decision system which is then carried out. Processing continues at return node 514.

Figure 2:
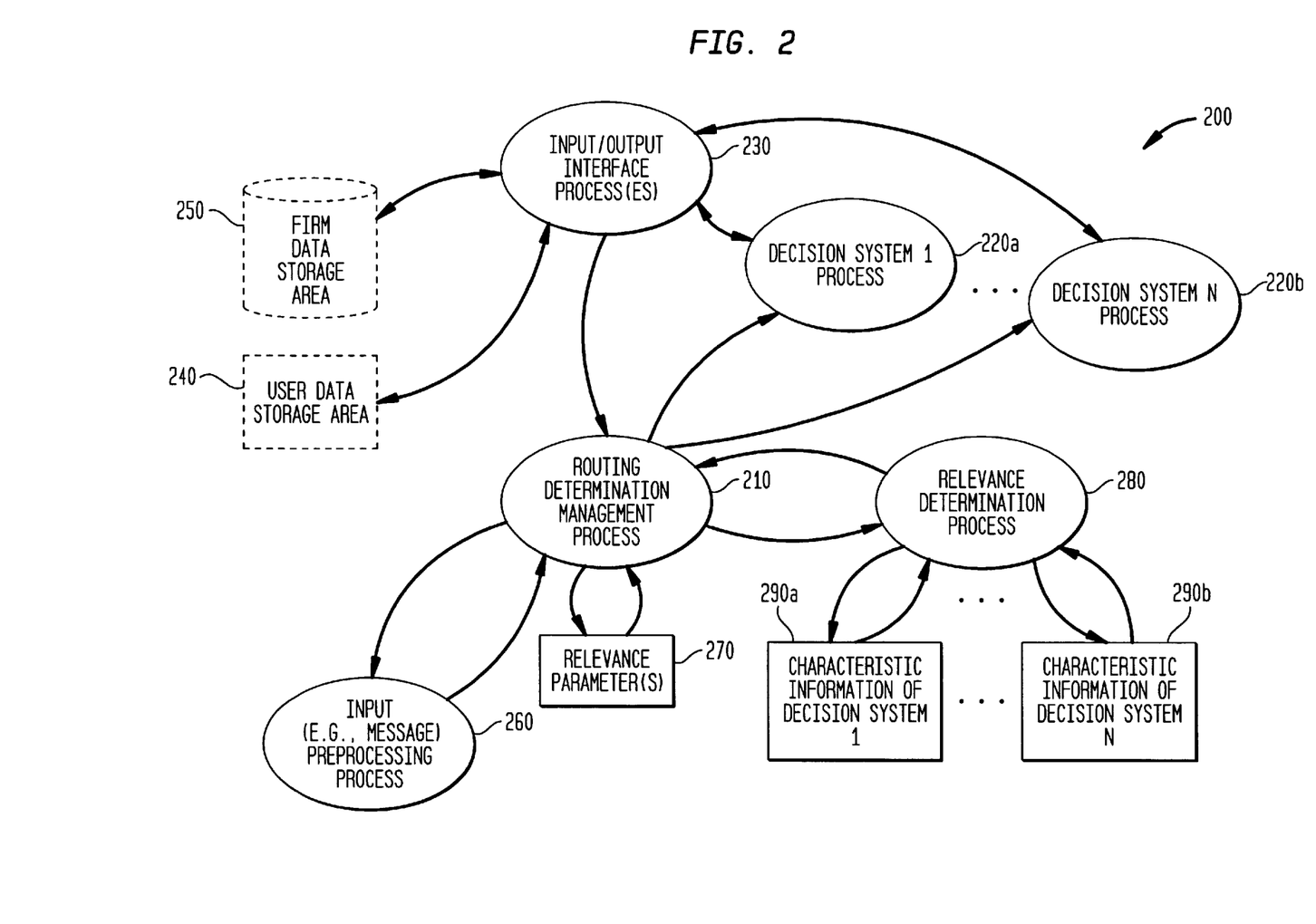
FIG. 2 is a process bubble diagram of a system for determining whether to route an input to a decision system based on a relevance between the input and the decision system.

FIG. 2 is a process bubble diagram of a system 200 for practicing the invention. Referring again to FIG. 14, the processes discussed below may be software modules stored on an area(s) of the storage device(s) 1406 and executed by the processor(s) 1402. The values provided to the modules may also be stored on an area(s) of the storage device(s) 1406. The system 200 may include a routing determination management process 210, decision system processes 220, input/output interface process(es) 230, an input (e.g., message) preprocessing process 260, and a relevance determination process 280. The system 200 may also include stored information such as relevance parameter(s) 270, characteristic information 290 of the decision systems 220, user data 240, and firm data 250. As shown in FIG. 2, the routing determination management process 210 may interact with and provide data to the decision system processes 220, may interact and exchange data with the relevance determination process 280 and the message preprocessing process 260, and may interact with and receive data from the input/output interface process(es) 230 and the relevance parameter(s) storage area 270. The relevance determination process 280 may further interact with and receive data from the characteristic information of decision system storage area(s) 290. Finally, the input/output interface process(es) 230 may further interact and exchange data with the decision system processes 220, the user data storage area 240, and the firm data storage area 250.

Referring to both FIG. 2 and FIG. 14, note that the input/output interface process(es) 230 may be implemented by software and/or by the input/output interface unit(s) 1404. For example, the input/output interface process(es) may (i) receive an e-mail message and perform application layer interface operations to extract information needed by the present invention and (ii) may manage data storage and retrieval (e.g., in accordance with the small computer standard interface (or "SCSI") protocol).

Figure 4:
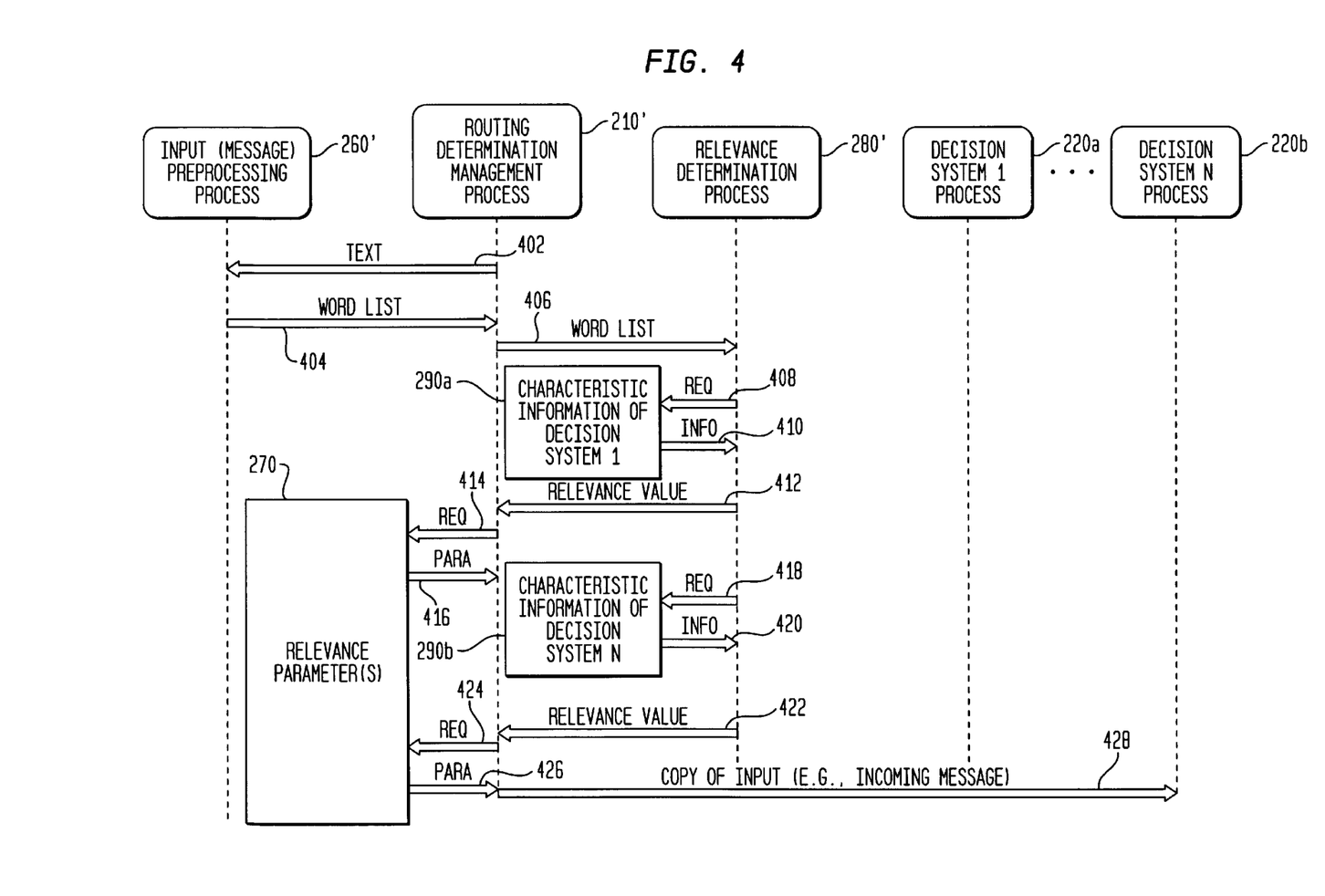
FIG. 4 is a message flow diagram which illustrates the operation of the system of FIG. 2.

FIG. 4 is a message flow diagram which illustrates the operation of the system of FIG. 2. Initially, a routing determination management process 210' receives an input, such as an e-mail message from an input/output interface process(es) 230 (not shown for clarity). Process messaging involved with preprocessing the input (message) is as follows. The routing determination management process 210' forwards the text of the input (message) to a message preprocessing process 260' in communication 402. In response, the message preprocessing process 260' returns a word list, based on words from the message, to the routing determination management process 210' in communication 404.

Process messaging involved with determining the relevance of the preprocessed message with respect to a decision system is as follows. The routing determination management process 210' provides the word list to a relevance determination process 280' in communication 406. The relevance determination process 280' submits a request 408 for characteristic information (e.g., a word list) of the first decision system to storage area 290a. Such information is returned to the relevance determination process 280' in communication 410. The relevance determination process 280' then determinations a relevance value (recall, for example, steps 502, 504 and 506 of exemplary process 500 of FIG. 5). The determined relevance value is provided to the routing determination management process 210' in communication 412. The routing determination management process 210' then submits a request 414 for a relevance parameter(s) (e.g., a predetermined threshold value) to storage area 270. In this instance, it is assumed that the input (message) was not sufficiently relevant to the first decision system 1 to warrant executing the decision system process 220a.

Similar messaging occurs for the other decision systems. For example, the relevance determination process 280' submits a request 418 for characteristic information (e.g., a word list) of the nth decision system to storage area 290b. Such information is returned to the relevance determination process 280' in communication 420. The relevance determination process 280' then determinations a relevance value (recall, for example, steps 502, 504 and 506 of exemplary process 500 of FIG. 5). The determined relevance value is provided to the routing determination management process 210' in communication 422. The routing determination management process 210' then submits a request 424 for a relevance parameter(s) (e.g., a predetermined threshold value) to storage area 270. In this instance, it is assumed that the input (message) was sufficiently relevant to the nth decision system. Accordingly, the routing determination management process 210' sends a copy of the input (incoming message) to the decision system N process 220b in communication 428.

The decision system N process 220b then operates, for example, based on rules, on the input (message) to make a decision(s) and/or take an action(s). Referring back to FIG. 2, the decision system N process 220b may access user and firm data from storage areas 240 and 250, respectively, via the input/output interface process(es) 230.

In the following, an exemplary system for determining whether to route an incoming e-mail to a rule-based system for responding to a product inquiry and/or a rule-based system for scheduling a meeting is described. Referring to FIG. 2, in this exemplary system, the message preprocessing process 260 is a text to word list translation process (see, e.g., the process 600 of FIG. 6), the relevance determination process 280 is a process for determining a cosine distance (see, e.g., steps 502, 504 and 506 of FIG. 5) between an m-dimensional vector based on a preprocessed message and an m-dimensional vector based on a word list which characterizes a decision system, the decision system 1 process 220a is a rule-based decision process for scheduling a meeting, the decision system N process 220b is a rule-based decision process for responding to a product information request, the input/output interface process(es) 230 includes a SCSI adapter, the decision parameter(s) storage area 270 includes a predetermined threshold value between zero (0) and one (1), the firm data storage area 250 contains product information, and the user data storage area includes data regarding a salesperson's work schedule, times when he or she will be in the office, and a rank ordered list of others which will handle the salespersons e-mail in their absence.

In this example, suppose that the above processes are implemented on a personal computer of a salesperson and that salesperson is away from their desk. Further assume that the salesperson's firm sells products "zzz", a low volume, high profit margin item, and "qqq", a high volume, low profit margin item. A list of rules which define the rule-based decision system for scheduling a meeting is attached as Exhibit A and a list of rules which define the rule-based decision system for responding to a product inquiry is attached as Exhibit B.

Figure 7A:
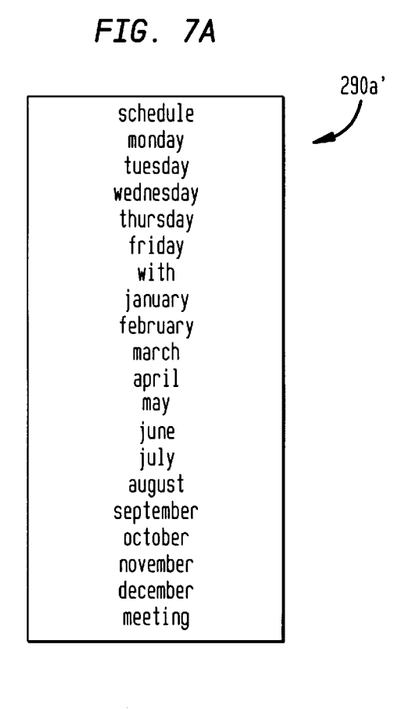
FIG. 7a is exemplary characteristic information (in this case a word list) related to a rule-based system for scheduling a meeting.
Figure 7B:
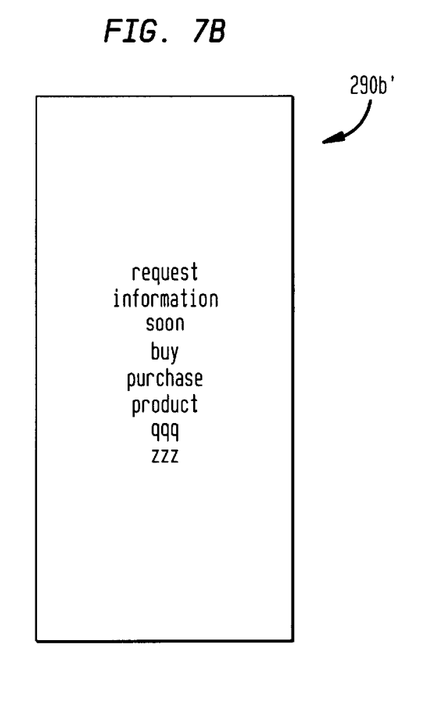
FIG. 7b is exemplary characteristic information (in this case a word list) related to a rule-based system for responding to an inquiry for product information.

Referring to FIGS. 2, 7a, and 7b, the characteristic information 290a' of the decision system for scheduling a meeting is a word list including the words "schedule", "meeting", "with", and the days of the week and the months of the year as shown in FIG. 7a. The characteristic information 290b' of the decision system for responding to a product inquiry is a word list including the words "request", "information", "soon", "buy", "purchase", "product", "qqq", and "zzz" as shown in FIG. 7b.

Figure 8:
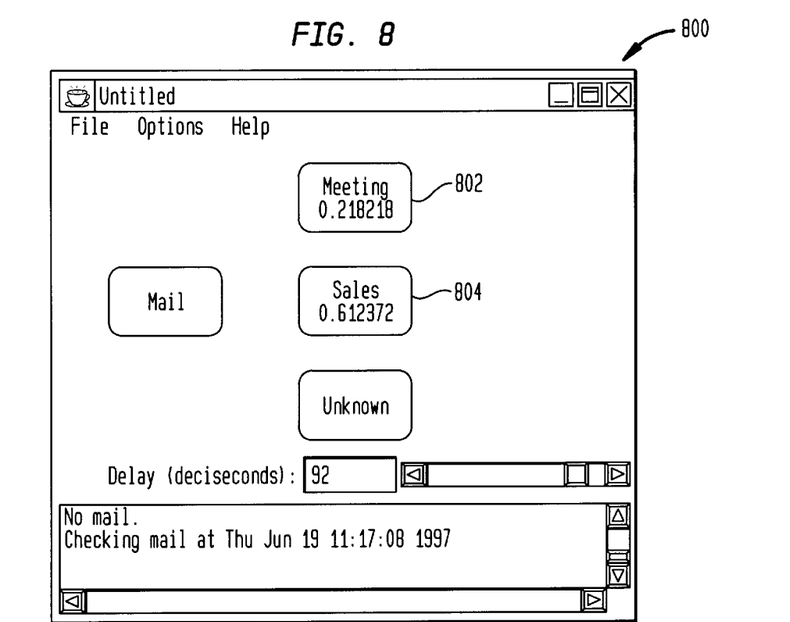
FIG. 8 is a graphical user interface window of a system for determining whether to route an e-mail message to at least one of a rule-based decision system for responding to an inquiry for product information and a rule-based decision system for responding to an request for a meeting.
Figure 11:
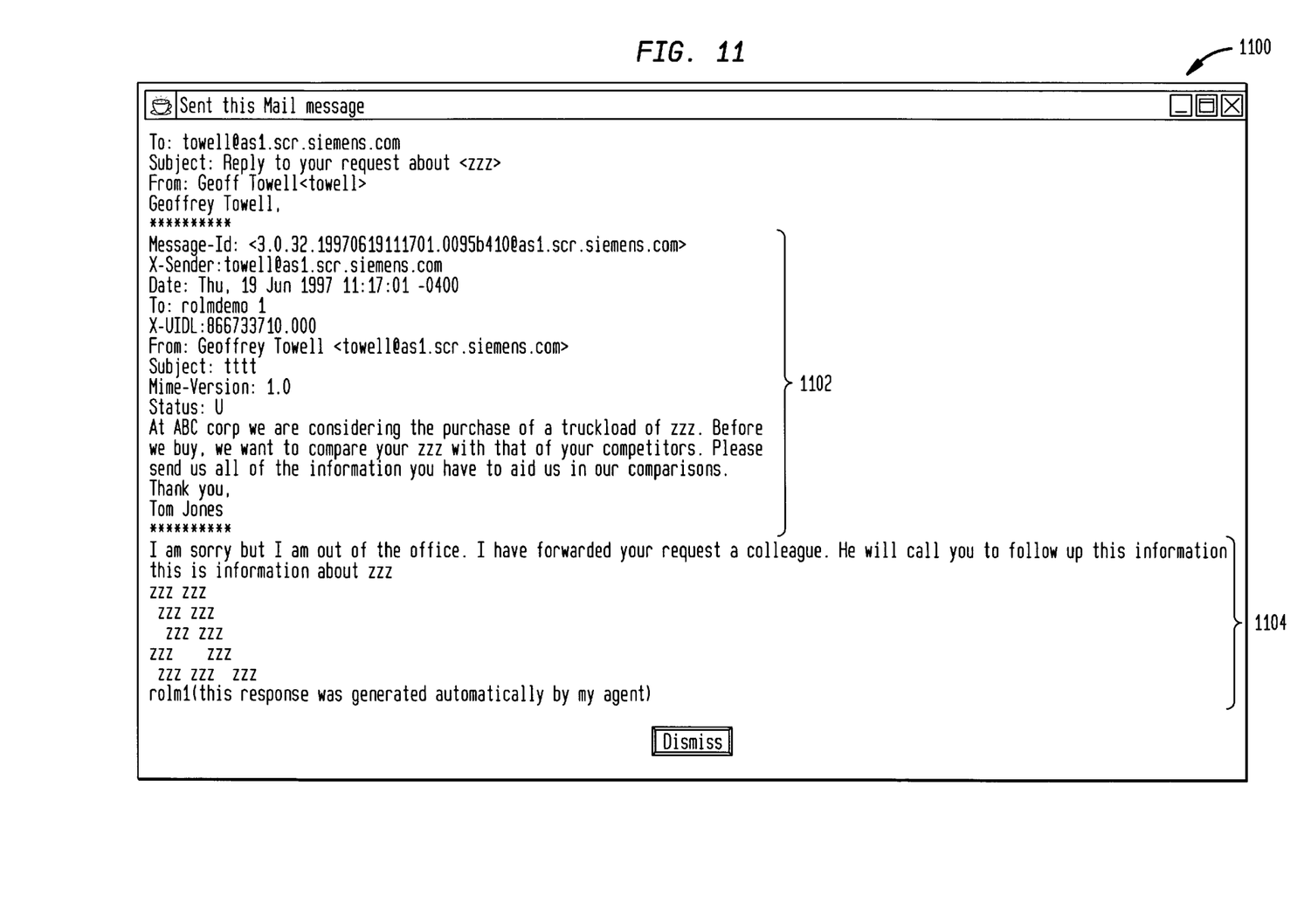
FIG. 11 is graphical user interface window which depicts an incoming e-mail message and a response generated by a rule-based decision system.
Figure 12:
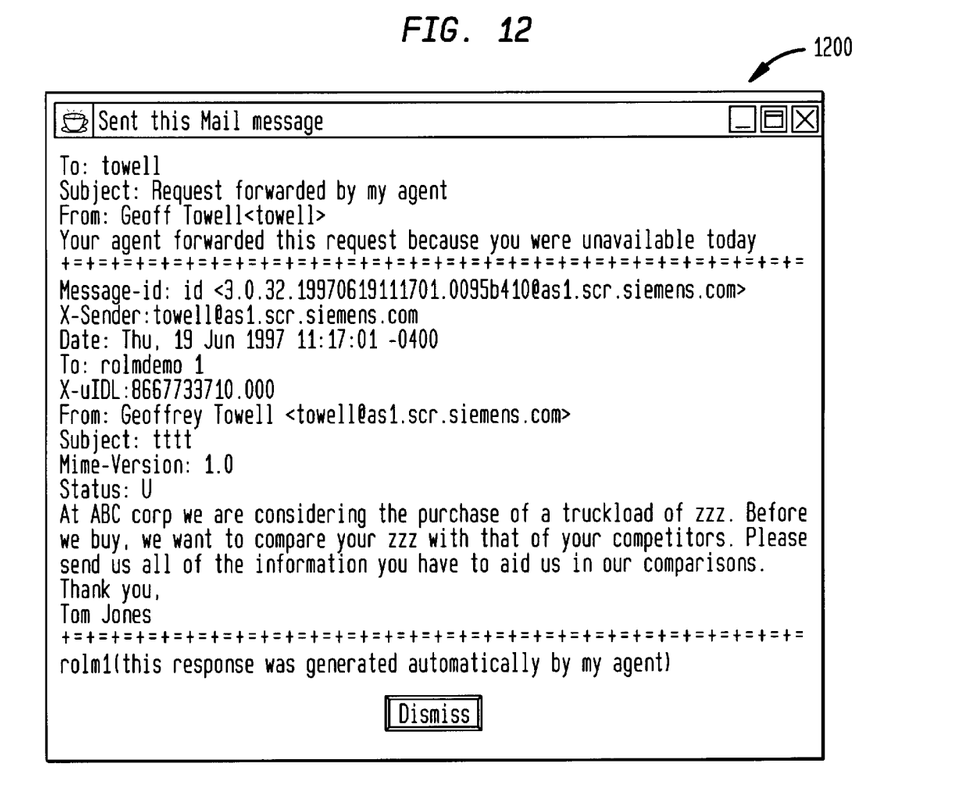
FIG. 12 is a graphical user interface window which depicts a status message generated by a rule-based decision system in response to an e-mail message.

Referring to FIG. 11, assume that an e-mail message 1102 is received by the salesperson's computer while they are out of the office (as determined, for example, by information in the firm and/or user data storage areas 250 and/or 240, respectively. FIG. 8 is a graphical user interface window 800 of the exemplary system. A cosine distance between an m-dimensional vector of the preprocessed e-mail message and the word list at storage location 290a' (which characterizes the process for scheduling a meeting) is 0.218228 as shown in display area 802, while a cosine distance between the n-dimensional vector of the preprocessed e-mail message and the word list at storage location 290b' (which characterizes the process for responding to a request for product information) is 0.612372 as shown in display area 804. Assuming a predetermined threshold value of 0.25, the (rule-based decision) process for replying to a request for product information is carried out.

Figure 9:
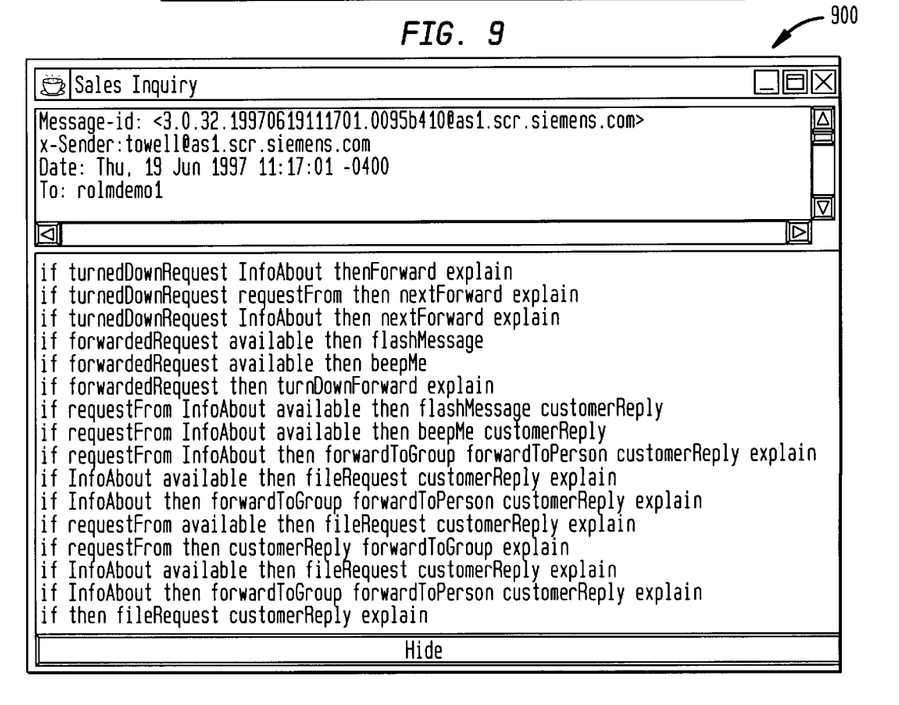
FIG. 9 is a graphical user interface window which depicts the processing of a rule-based decision system for responding to an inquiry for product information.

FIG. 9 is a graphical user interface window 900 which depicts the processing of the rule-based decision system for responding to an inquiry for product information.

Figure 10:
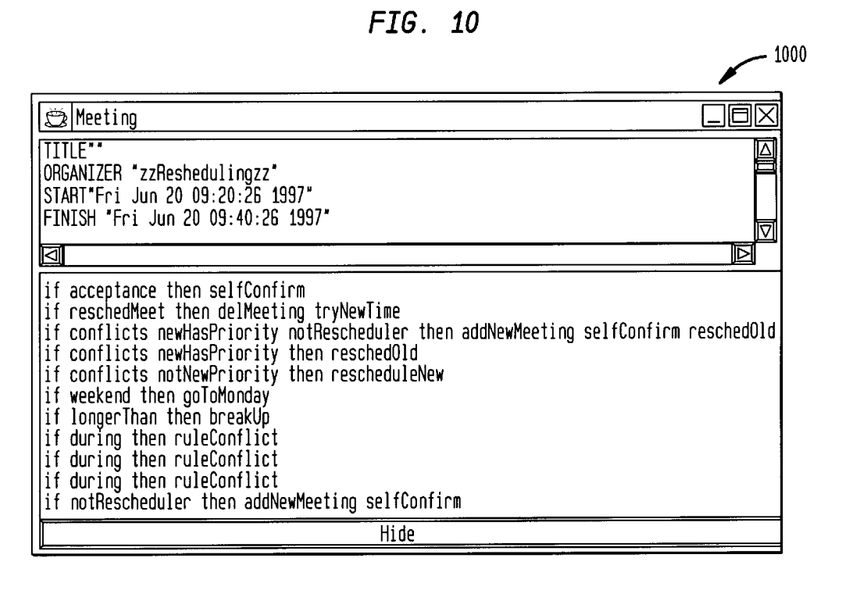
FIG. 10 is a graphical user interface window which depicts the processing of a rule-based decision system for scheduling a meeting.

FIG. 10 is a graphical user interface window 1000 which depicts the processing of a rule-based decision system for scheduling a meeting. FIG. 11 is graphical user interface window 1100 which depicts the incoming e-mail message 1102 and a response 1104 generated by the rule-based decision system for processing a response to a product information request. FIG. 12 is a graphical user interface window 1200 which depicts a status message generated by the rule-based decision system in response to the e-mail message 1102.

Figure 13:
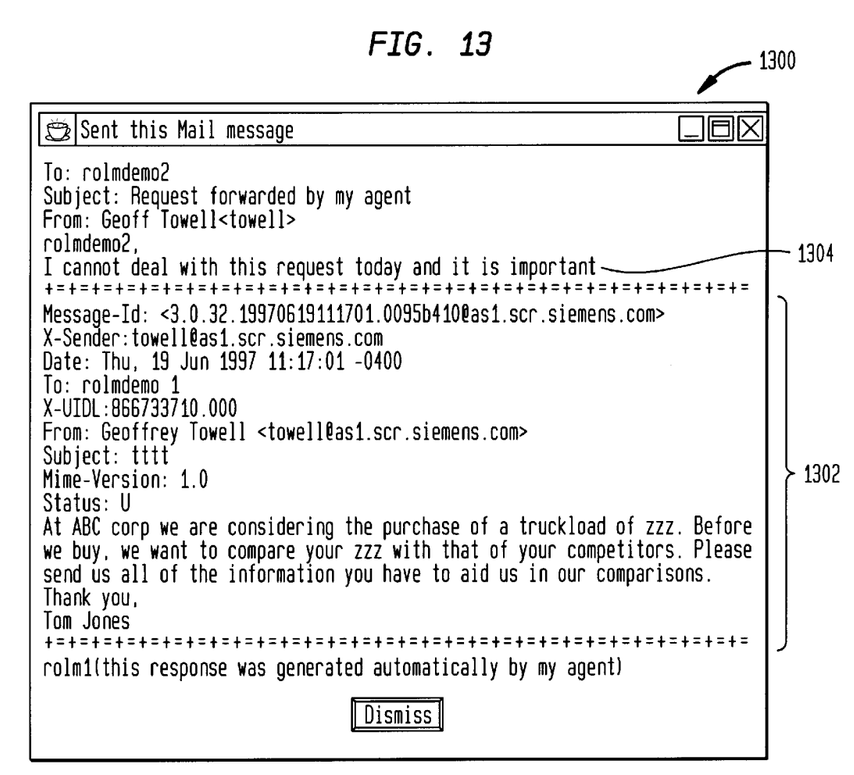
FIG. 13 is a graphical user interface window which depicts a request message generated by a rule-based decision system in response to an e-mail message.

FIG. 13 is a graphical user interface window 1300 which depicts a request message generated by the rule-based decision system for responding to a product inquiry in an e-mail message 1102. More specifically, since the "zzz" product is a low volume, high profit margin item, the rule-based decision system for responding to a product inquiry forwards a request to another salesperson (e.g., based on a preference of the salesperson stored in user data storage area 240 and a schedule of other salespersons in the firm data storage area 250.). The window 1300 includes a copy of the original message 1302 as well as a request 1304 which notes the fact that the salespeople to which the e-mail was originally addressed cannot deal with the request today but that the request is important.

The context router 110 is not infallible; it may indeed route an input (message) to an inappropriate decision system 120. In this case, the present invention may advantageously include a feedback communication (not shown) from the inappropriate decision system 120 to the router determination unit 110 to inform the router determination unit 110 that it 120 cannot process the input (message). In response, the router determination unit 110 may apply the input (message) to another decision system 120 whose relevance with respect to the input (message) meets the decision parameter(s). If no decision systems 120 are found to be adequately relevant to the input (message), the router determination unit 110 may so inform a user.

In another application for the system 100, one of the decision systems 120 may be a rule-based decision system for routing an incoming query to an appropriate person in a technical help center.

Thus, using the router determination unit advantageously permits the rule-based decision systems (or other types of decision systems) to be separated based on context. Thus, the rules are less complex, rules may be more efficacious, and rule changes are more easily implemented. For example, the rule-based decision system for scheduling a meeting will treat the word "not" as a time when a person is not available for a meeting. Without such relevance based routing, treating the word "not" would cause problems as discussed above in the background.

What is claimed is:

1. A device for determining whether to apply an input to at least one of two decision systems, the device comprising:
   a) a relevance determination unit for determining a relevance of the input with respect to each of the at least one of the two decision systems;
   b) means for applying a predetermined relevance parameter to each of the determined relevance associated with each of the at least one of the two decision systems; and
   c) means for applying the input to the at the least one of the two decision systems if the relevance associated with that decision system meets the predetermined relevance parameter.

2. The device of claim 1 wherein the relevance determination unit is an information retrieval means.

3. The device of claim 1 wherein the relevance determination unit determines a distance between a vector based on words of the input and at least one known vector, each of the at least one known vector being determined by words related to an associated one of the at least one of the two decision systems.

4. The device of claim 1 wherein the relevance parameter is a predetermined threshold value.

5. A program storage device readable by machine, tangibly embodying a program of instructions executable by the machine to perform method steps for deciding whether to apply an input, applied to a routing determination unit, to at least one of the first and second decision systems, the method steps comprising:
   a) determining a relevance value of the input with respect to each of the first and second decision systems;
   b) applying a relevance parameter to the determined relevance value associated with each of the first and second decision systems;
   c) invoking the first decision system if the relevance value associated with the first decision system meets the applied relevance parameter; and
   d) invoking the second decision system if the relevance value associated with the second decision system, meets the applied relevance parameter.

6. The program storage device of claim 5, wherein said method steps further comprise preprocessing the input before the step of determining a relevance value is performed.

7. The program storage device of claim 6 wherein the input includes textual information, and
   wherein the step of preprocessing includes at least one sub-step from a group of sub-steps consisting of removing word stems, removing punctuation, removing stop words, replacing capital letters with lowercase letters and alphabetizing.

8. The program storage device of claim 7 wherein the input is an e-mail message.

9. The program storage device of claim 5 wherein the step of determining a relevance value of the input with respect to each of the first and second decision systems includes sub-steps of:
   i) forming a first vector in m-dimensional space based on words contained in the input,
   ii) forming a second vector in m-dimensional space based on words associated with the first decision system;
   iii) forming a third vector in m-dimensional space based on words associated with the second decision system;
   iv) determining a relevance value of the input with respect to the first decision system based on a distance between the first and second vectors; and
   v) determining a relevance value of the input with respect to the second decision system based on a distance between the first and third vectors.

10. The program storage device of claim 9 wherein the distance between the first and second vectors and the distance between the first and third vectors are cosine distances.

11. The program storage device of claim 5 wherein the relevance parameter is a predetermined threshold value.

12. The program storage device of claim 11 wherein the step of applying the relevance parameter to the relevance value associated with each of the first and second decision systems includes sub-steps of comparing the relevance value associated with each of the first and second decision systems with the predetermined threshold value.

13. A system for processing an input, the system comprising:
   a) a first decision system having a first set of characteristic information;
   b) a second decision system having a second set of characteristic information;
   c) a relevance parameter; and
   d) a routing determination unit, the routing determination unit having
      i) an input for receiving the input,
      ii) a first output coupled with the first decision system, and
      iii) a second output coupled with the second decision system, and determining
         i) a first relevance value based on the input and the first set of characteristic information of the first decision system,
         ii) whether to apply the input to the first decision system based on the first relevance value and the relevance parameter,
         iii) a second relevance value based on the input and the second set of characteristic information of the second decision system, and
         iv) whether to apply the input to the second decision system based on the second relevance value and the relevance parameter.

14. The system of claim 13 wherein the input includes textual information.

15. The system of claim 14 wherein the first set of characteristic information is a first word list and the second set of characteristic information is a second word list.

16. The system of claim 14 wherein the routing determination unit includes a relevance determination unit for
   i) determining the first relevance value based on a distance between an m-dimensional vector based on words of the input and an m-dimensional vector based on words of the first word list, and
   ii) determining the second relevance value based on a distance between an m-dimensional vector based on words of the input and an m-dimensional vector based on words of the second word list.

17. The system of claim 13 wherein at least one of the first and second decision systems is a rule-based system.

18. The system of claim 13 wherein the first decision system is a rule-based system for scheduling a meeting and the second decision system is a rule-based system for responding to a product inquiry.

19. The system of claim 18 wherein the first set of characteristic information is a first word list which includes at least one word selected from a group of words consisting of the days of the week, the months of the year, and the words "schedule", "with" and "meeting", and wherein the second set of characteristic information is a second word list which includes at least one word selected from a group of words consisting of the words "request", "information", "soon", "buy", "purchase", and "product".

20. The system of claim 13 further comprising a storage area for storing firm data, contents of the storage area being accessible by at least one of the first and second decision systems.

21. The system of claim 20 wherein the firm data includes product information.

22. The system of claim 20 wherein the firm data includes employee schedules.

23. The system of claim 13 further comprising a storage area for storing personal data, contents of the storage area being accessible by at least one of the first and second decision systems.

24. The system of claim 23 wherein the personal data includes a list of employees to respond to an employees e-mail when the employee is unavailable.

25. The system of claim 13 where if the input is applied to one of the first and second decision systems and the one of the first and second decision systems cannot process the input, the one of the first and second decision systems so informs the routing determination unit.

26. The system of claim 13 wherein the first decision system is a rule-based system for assigning incoming queries to an appropriate person in a help center.

* * * * *